April 6, 1965    I. G. HENDRICKSON    3,176,505
VIBRATION ENERGY TRANSFER TECHNIQUES
USING STRETCHED LINE ELEMENT Filed Aug. 13, 1962    4 Sheets-Sheet 1

INVENTOR.
IVER GLEN HENDRICKSON

ATTORNEYS

April 6, 1965

I. G. HENDRICKSON 3,176,505

VIBRATION ENERGY TRANSFER TECHNIQUES
USING STRETCHED LINE ELEMENT

Filed Aug. 13, 1962

INVENTOR.
IVER GLEN HENDRICKSON
BY
Reynolds & Christensen
ATTORNEYS

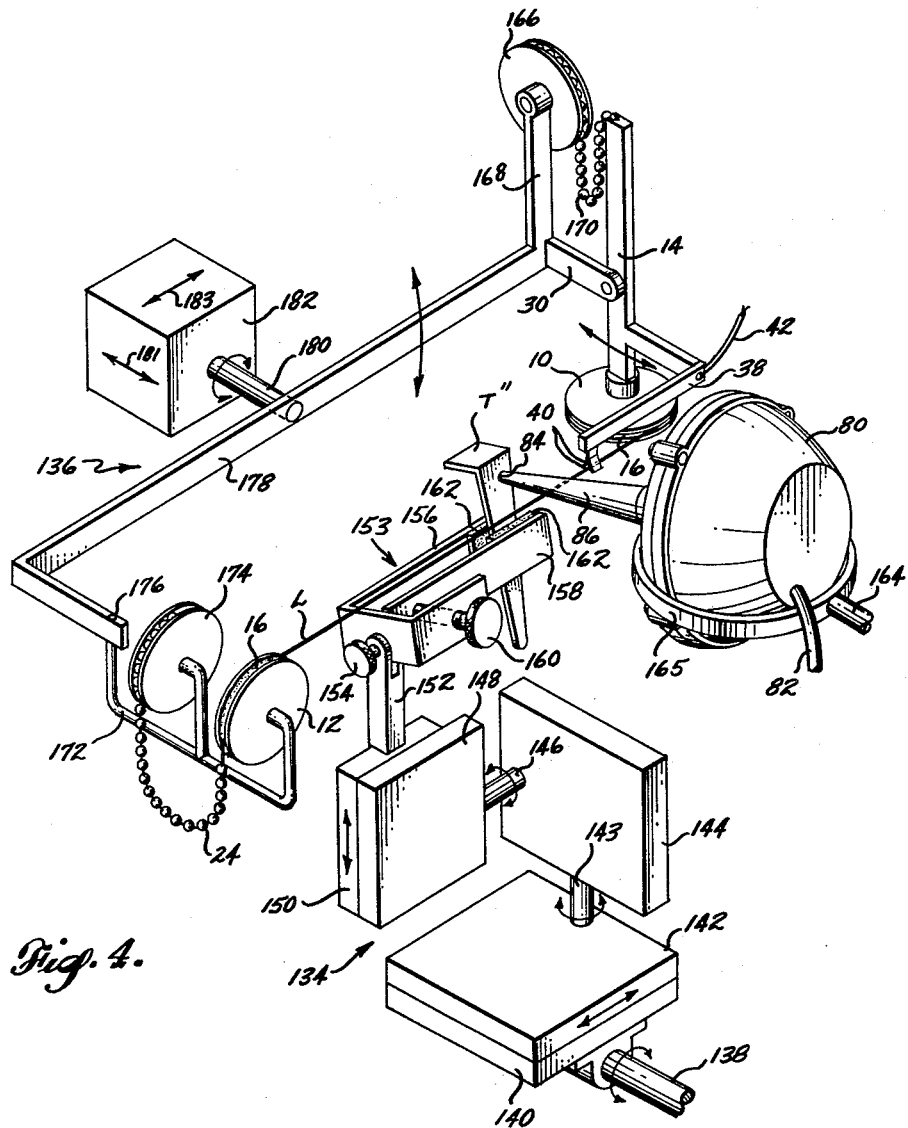

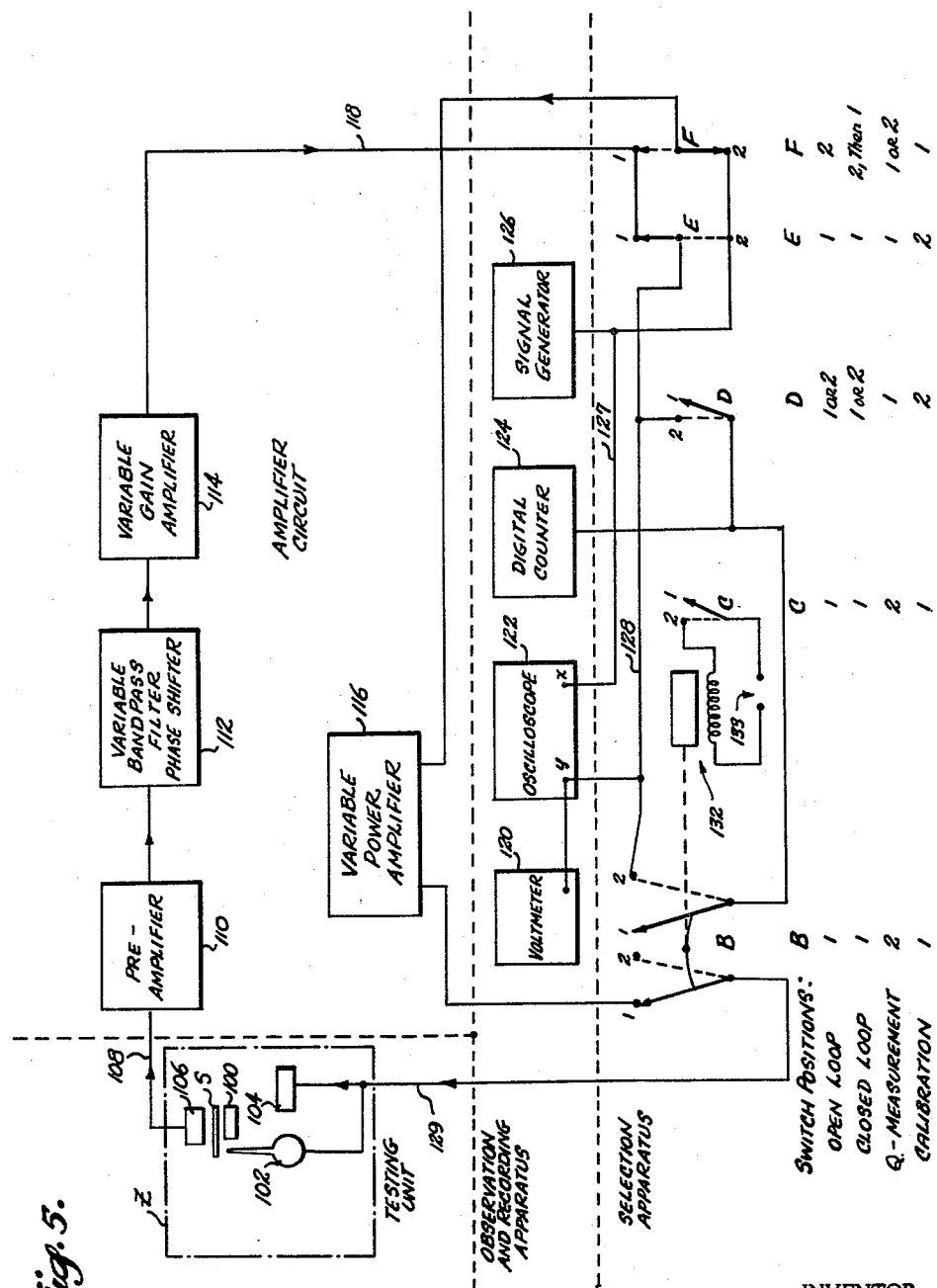

United States Patent Office 3,176,505
Patented Apr. 6, 1965

3,176,505
VIBRATION ENERGY TRANSFER TECHNIQUES USING STRETCHED LINE ELEMENT
Iver Glen Hendrickson, Seattle, Wash., assignor to The Boeing Company, Seattle, Wash., a corporation of Delaware
Filed Aug. 13, 1962, Ser. No. 216,387
29 Claims. (Cl. 73—67.2

This invention relates to devices and systems for converting between mechanical vibrational energy and oscillations of another form of energy. More particularly, it relates to apparatus for sensitively detecting vibrations in a body or specimen and transferring the detected vibrations to another energy system, such as an electrical circuit; or conversely, for imparting vibrations to a vibratable body in response to oscillations in another energy system. The invention also encompasses means used in conjunction with the novel detecting means for supporting nonsymmetrical components includable in the apparatus for testing, and in addition certain systems in which the novel apparatus may be used. While the invention is herein illustratively described in terms of certain presently preferred forms thereof, it will be recognized that various changes and modifications therein may be made with respect to details without departing from the essential scope of the invention.

In the past certain nondestructive techniques have been employed to examine physical properties and characteristics of materials. Examples of these techniques include hardness tests, ultrasonic inspection, eddy current and electrical resistivity tests, and X-ray analyses. Although these nondestructive tests are widely used for determining physical properties of metal alloys and some nonmetals, they have had certain inherent limitations and disadvantages, such as less than desired sensitivity to strength properties as related to atomic structure, high dependence upon the size, shape and surface conditions of specimens, analysis of a specimen only on a point to point basis, or the production of small indentations or markings upon the specimen.

Ultrasonic techniques have been attempted in which a specimen is excited into vibration by means of a quartz transducer or the like and the resulting vibrations detected and analyzed. In these, various forms of apparatus and techniques have been devised for sensitively converting physical vibrations of the specimen into electrical oscillations for analysis, usually for relating physical characteristics to nonresonant frequency and attenuation of energy through the specimen. In all such systems there has been a notable lack of success in detecting the effects of residual stress (strain) and minute variations in characteristics, particularly very minute variations such as those due to changes in atomic arrangement caused by presence of interstitial atoms, for example. The primary reasons for this lack of success have been an inherent lack of sensitivity in the nonresonant testing approach and the presence of excessive external loading on the test specimen. One ultrasonic technique is a resonant testing method utilizing a composite oscillator comprising a quartz transducer and a specimen of material ground to proper dimensions causing it to have the same resonant frequency as the quartz transducer. This method, however, involves tedious and costly specimen preparation and cannot be conveniently used with specimens or components of fixed or varied shapes and sizes. No satisfactory means of the required sensitivity has heretofore been devised for measuring damping or internal friction characteristics of materials for correlation with their strength properties.

It is therefore a broad object of this invention to provide improved methods and apparatus for examining strength properties of metals and nonmetals by nondestructive techniques.

A further object hereof is to provide novel means of measuring the internal friction or damping characteristics of materials for correlation with their strength properties.

Another broad object of this invention is to provide improvements in methods and apparatus for detecting vibrations in a vibrating specimen which will overcome defects and inadequacies in prior techniques and systems and achieve a degree of sensitivity making possible measurements of very minute variations in atomic arrangement characteristics of materials.

It is a related object hereof to provide apparatus and techniques for more precise detection of the frequency and amplitude of vibration of a specimen in any mode of vibration, and particularly providing improved techniques for resonant testing.

A further related object hereof is to provide apparatus of sufficient sensitivity to permit examination of the effect upon a material of the presence of impurities, atomic imperfections, interstitial atoms, residual stress, and the like, and furnishing information regarding the physical history of the material.

Another object hereof is to provide in such apparatus certain novel means for supporting for testing therein components of various shapes and sizes, thereby eliminating necessity for especially forming specimens of materials to be tested and permitting testing of actual structural components directly.

Another object is to provide such vibration detecting apparatus which is adapted to be used throughout a wider range of temperature variations than previous devices and which is adapted to measure changes in specimen characteristics due to such rapid temperature changes as accompany a thermal shock type test, for example.

Another highly important object of this invention is to provide frequency selective and amplitude sensitive apparatus having broader applications as an integral part of certain electrical instruments and systems such as highly stable, high "Q" oscillators, band-pass filters, temperature indicating devices, material fatigue damage analyzers, and others. More particularly, the invention provides means and techniques for sensitively coupling a frequency-determining vibratable body in such system, resonant vibration of which determines the frequency at which energy is passed. More sensitive energy transfer coupling to the vibratable body, used in place of a tuning fork, for example, renders the overall "Q" of the oscillator higher, the energy band of the filter narrower, etc.

The internal friction properties of a material are measured, generally, by measuring its damping characteristics, or by measuring the reciprocal quantity, designated by the symbol Q, which is a measure of the deviation of the material from perfect elasticity. Relative valves of Q for different materials reflect the relative abilities of their atoms to return to the original (or new similar) orientation after being disarranged by stress, temperature change, vibration, fatigue, or the like. According to this invention the relative measurements of Q of materials are used as measures of their various other characteristics and changes therein.

The novel method of the invention chiefly entails testing for the Q of a material by supporting a specimen or component of the material in testing apparatus such as that herein described imposing negligible loading on the specimen, exciting it into vibration at its resonant frequency while detecting vibrations therein by detecting vibrations in an elongated flexible line element held under tension in point contact with the specimen, adjusting the supporting and detecting means of the apparatus to achieve maximum energy transfer in the system, terminating excitation of the specimen, and analyzing the resulting decay in the vibrations as detected through the element in order thereby to determine characteristics of the specimen or component material.

The vibrations of the test body are detected by novel means and analyzed during their decay after the excitation means is removed. The rate of decay of the vibrations is a measure of the damping characteristic of the specimen material, as compared with others. However, it is also a measure of the damping caused by external forces such as the supporting and the detecting means. Reduction of the damping effect of these external forces, which is especially important for resonant testing, therefore results in a more accurate measurement of the damping characteristic (or Q) of the material itself. All the features of and techniques incident to the operation of novel apparatus provided by this invention are directed to this end. Its principal advantage lies in the fact that it provides novel means for reducing the external loading on the test body to a negligible value while permitting more sensitive detection of variations in the vibration of the specimen than previous devices.

The novel vibrational energy transfer apparatus of the invention includes an elongated flexible line element, such as a wire, held under tension in substantially point contact near its center with a vibrating test body excited at a suitable frequency by vibration imparting means. Means are provided for conveniently adjusting such contact for minimum loading on the test body. Damping means engage the line element to permit predominantly only traveling waves to form thereon. In normal operation a test body is carefully supported, in order to assure minimum loading, at one or more of its nodal regions, the location and extent of which are determined by means of the apparatus itself. The test body is excited at its resonant frequency in either its torsional or flexural mode of vibration. Continuous point contact maintained between the line element and the vibrating test body creates traveling waves in the line element. Such traveling waves are detected by a suitable transducer or pickup element such as a crystal or the like located between the contact point and the damping means. The transducer output oscillations are applied to a measuring or analyzing system.

The physical characteristics of the line element and the tension under which it is held are chosen such that its resonant frequency is substantially removed from the frequency of vibration of the test body. Establishing the point of contact with the line element near a node of the test body and substantially at the mid-point of the line element, with the vibration energy of the specimen being transferred transversely to direction of extent of the line element, achieves minimum loading because the mechanical advantage of the force on the line element approaches infinity as the amplitude of vibrations approaches zero. Micro-adjustments in the apparatus permit changing the relative positions of the line element and specimen to achieve optimum conditions.

It is often useful to measure physical properties and characteristics of materials in the form of irregularly-shaped specimens, or to measure the effect of bending, shaping, etc., by testing such specimens before and after shaping or other treatment. In addition, it is frequently necessary to test irregularly-shaped components formed or machined for actual use in various devices and structures. Such irregular, nonsymmetrical components cannot normally be tested, particularly in the torsional mode, by balancing them at a node as can symmetrical specimens, since a resonant node of such a body seldom coincides with its center of gravity, so that to balance such a body thereon would introduce excessive external damping influence. The approach according to this invention is therefore to lightly grip the component at a resonant node thereof, as experimentally determined by means of the novel line element vibration detection apparatus itself, then to position the same for minimum loading by adjustment of different positioning means provided in the apparatus, while sonically exciting the test body and detecting vibrations therein by use of the line element as previously described.

The invention also resides in novel vibrational energy transfer systems and techniques for detection and measurement of fatigue damage in materials under actual service conditions.

These and other features, steps, objects and advantages of the invention will become more apparent from the following more detailed description taken in connection with the accompanying drawings which illustrate presently preferred forms thereof.

FIGURE 1a is a perspective view of specimen supporting apparatus for use in the testing apparatus of FIGURE 1 for supporting a specimen for vibration in the torsional mode, also diagrammatically showing by dotted lines a zone of temperature variation.

FIGURE 4 is a somewhat diagrammatical perspective view of typical universal positioning means and detection apparatus for testing nonsymmetrical components according to the invention.

FIGURE 5 is a block diagram of typical electrical circuitry and switching means comprising control apparatus for use with the detecting apparatus of the invention.

Figure 1:
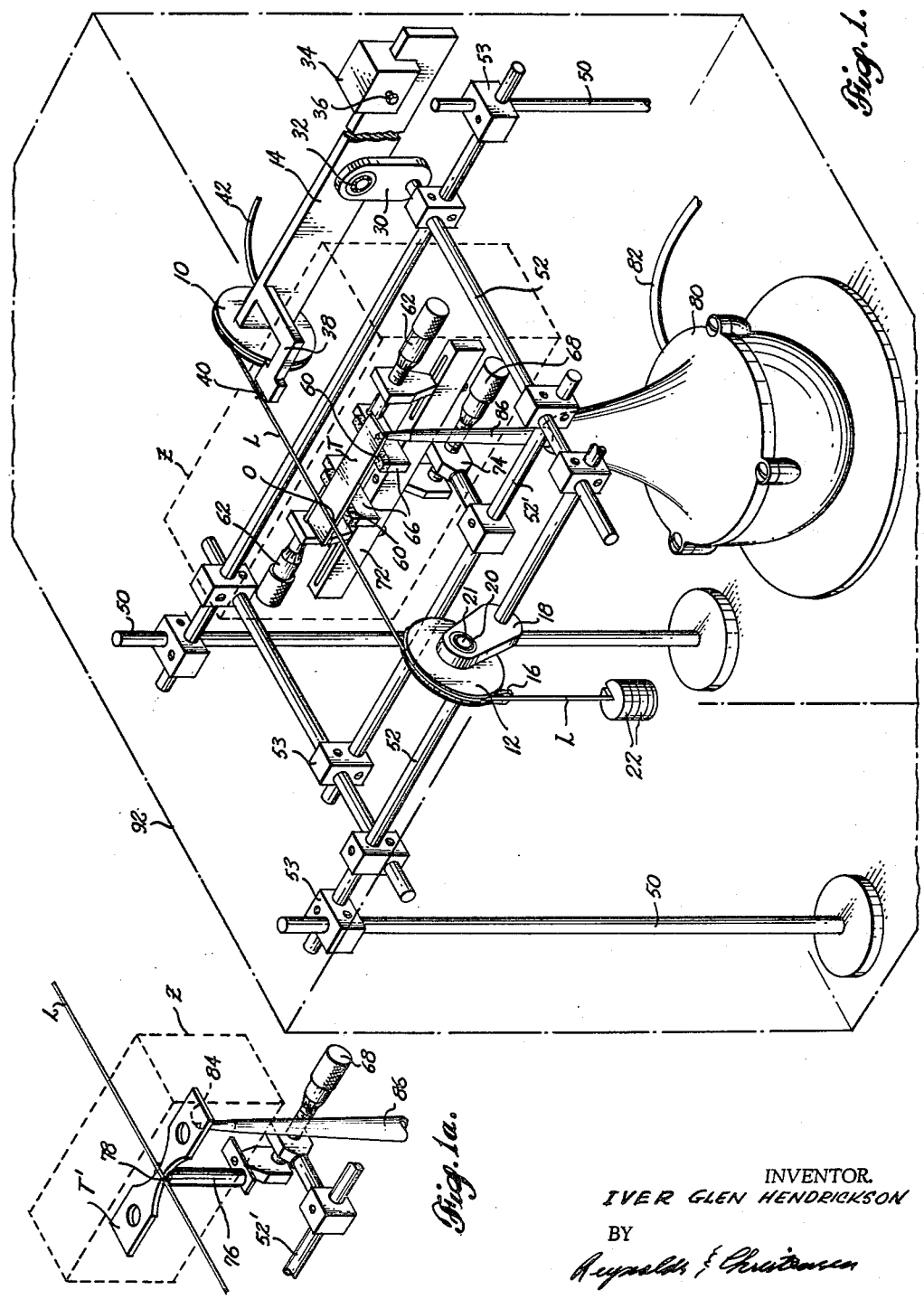
FIGURE 1 is a perspective view of testing apparatus used in practicing the invention and diagrammatically showing by dotted lines a zone of temperature variation and by dot-dash lines an acoustic hood.
Figure 2:
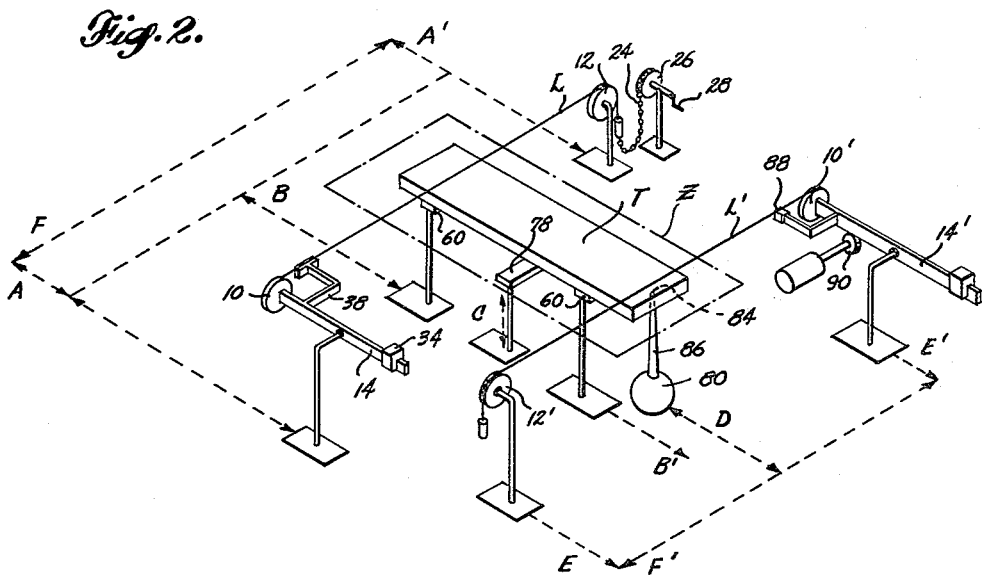
FIGURE 2 is a perspective schematic diagram of the essential apparatus for practicing the invention including alternative vibration exciting means and showing different positional adjustments of apparatus elements.

In the apparatus illustrated in FIGURES 1 to 2 a specimen or test body T in the form of a symmetrical flat strip is supported for vibrational study with line element L in point contact therewith at the point O intermediate the ends of the line element and on the edge of the test body. This line element preferably comprises a metal wire of such weight and dimensions and held under such tension that its resonant frequency is sufficiently removed from the vibration frequency of the test body T to aid in avoiding resonance in the line element. The pulleys 10 and 12 between which it is stretched comprise wave sinks for absorption of vibrations in order to permit essentially only traveling waves on the line element L. Pulley 10 is fixed against rotation on the balance arm 14. The line element wraps part way around pulley 10 and is secured thereto by suitable means not shown. The pulley surface contacted by the line element comprises vibration absorbing means such as a strip of foam rubber or the like. The contact surface of pulley 12 is likewise provided with padding 16 or the like establishing a sink for waves traveling toward it. This pulley, having its shaft 21 mounted in bearing 20 for free rotation on the bracket 18, also serves to establish tension in the wire L. A suitable means is provided in association with the pulley 12 for varying the tension in the line element L, such as adding different numbers and sizes of weights 22 (FIGURE 1) to the end of the line element, or varying the proportion of chain weight 24 borne by the line element (FIGURE 2) by operation of crank 23 and pulley 26.

The balance arm 14 carrying pulley 10 is pivotally mounted intermediate its ends on bearing 32 on bracket 30. Light contact pressure of line element L upon the specimen T is established by selective positioning of sliding weight 34 along the balance arm. Set screw 36 holds the weight in any adjusted position.

In this case the energy coupling means comprises a piezoelectric crystal 40 lightly engaging the line element L at a position thereon substantially removed from its point of contact with specimen T. Crystal 40 is preferably carried by an extension 38 of balance arm 14, so that its positional relationship with the line element remains constant. An electrical conductor 42 connects the transducer crystal 40 to control apparatus to be described hereinafter.

The entire testing unit is mounted upon a suitable supporting frame comprising vertical posts 50 supporting horizontal bars 52 which are connected together and to the posts by slidable connectors 53.

The invention contemplates vibrating the specimen in any of different modes of vibration. The supporting apparatus of FIGURE 1, which allows the specimen to vibrate in its flexural mode, consists principally of a pair of supports 60 adapted to be positioned at nodes of the specimen T when it is in vibration. The nodal supports 60 comprise small pads of a suitably soft substance presenting the least possible resistance to free vibration of the specimen, such as rectangular-shaped pieces of foam rubber, or the like. The means for relative positional adjustment of these supports to position them at nodes of the specimen comprise micrometer screw adjustments 62 mounted upon the supporting bar 72 and operating upon the horizontal bars 66 which carry the nodal supports 60. Another micrometer screw adjustment 68 is provided for shifting the specimen T longitudinally of itself with relation to the line element L to establish the desired contact point on the specimen with respect to its nodes. This micrometer adjustment 68, mounted upon supporting bracket 74 which is connected to the frame member 52', operates upon the elongated bar 72 carrying the nodal support bars 66 and their adjusting devices 62. In addition to permitting sensitive adjustment to minimize loading of the specimen, these micrometer support adjustments serve to permit repositioning the specimen and line element in the exact location and relationship of a previous test.

In FIGURE 1a a modified specimen T' (of special shape for a purpose later described) is supported to vibrate in its torsional mode, again with minimal loading thereon. In this case the specimen is balanced horizontally upon a pad 78 of foam rubber or the like atop supporting post 76, acting as a single nodal support and offering minimum resistance to vibrational distortion of the specimen. Supporting post 76 is carried by the micrometer adjustment 68 previously described, which again serves to permit proper positioning of the specimen with relation to the line element. In addition to permitting remounting the specimen at precisely the same position for successive tests, this balancing system for symmetrical specimens has other advantages hereinafter noted.

The illustrated means for exciting the specimen into vibration includes an audio speaker (not shown) encased within the container 80 and connected by electrical conductor 82 to a suitable source of electrical oscillations as later described. The container 80 is movable with respect to the specimen and is provided with an elongated horn 86 terminating in a very small orifice 84 directed against, but not touching, a selected point on the surface of the specimen T. The size of the orifice bears an approximate area ratio of about 1 to 300 relative to the surface area of the side of the test body against which it is directed, as shown in the drawings. When the enclosed speaker is in operation, a well-defined column of vibrating air is formed within the horn 86, causing vibration in the specimen. By appropriate selection of the point on the specimen at which the horn is directed, the specimen may be caused to vibrate in a particular mode consistent with the manner in which it is supported. Depending upon the excitation frequency, the support locations and the point of excitation, the specimen may be caused to vibrate in either a fundamental mode or a selected harmonic thereof as desired.

In FIGURE 2, wherein parts corresponding to those in FIGURE 1 bear the same numerals, an alternate specimen vibrator comprises a second line element L'. This element may be used when audio speaker 80 is unsuitable, such as when testing in a vacuum. Suspended between pulleys 10' and 12', the second line element L', preferably a wire, is held under tension in point contact with the specimen T and is excited into vibration by means of a suitable electromechanical transducer element 88 responsively connected to a suitable source of electrical oscillations (not shown). While the means for terminating excitation of the specimen with the speaker 80 as the excitation source may simply comprise a control switch, the preferred cutoff means in the case of the wire exciter L' comprises a motorized cam arrangement 90 operable to engage the balance arm 14' and thereby raise the wire L' from its point contact with the specimen. As depicted by arrows E and E' the supports for pulleys 10' and 12' carrying exciter wire L' are positionally adjustable with relation to the specimen so as to permit selecting the wire contact point on the specimen and thereby the mode of vibration induced therein and the loading effect imposed thereon by the wire.

Arrows A and A' depict relative positional adjustment of the vibration detecting line element L and the specimen T. Relative positioning of the nodal supports 60 is indicated by arrows B and B'. Arrow C indicates alternative use and adjustment of a single center nodal support 78 such as that illustrated in FIGURE 1a. Arrows F and F' depict adjustment of line elements L and L', respectively, in the direction of their lengths to permit obtaining maximum energy transfer between the specimen and the respective line elements and for adjusting phase relationships in the energy transfer system. It will be appreciated that while manual adjustment is the means indicated in FIGURES 1 and 1a for positioning the parts of the apparatus, other mechanical or automatic means may be devised for the same purposes.

In FIGURE 4, wherein parts corresponding to those in previous figures bear the same numerals, apparatus for testing nonsymmetrical specimens and components is shown.

A component or specimen T" of irregular shape is held by the universally positionable supporting means 134, a movable excitation means including a speaker encased within the container 80 having a small output orifice 84 is positioned adjacent a selected point on the test body, and novel detection apparatus including the line element L held by the movable supporting structure 136 is positioned to detect vibrations in the test body. The universally positionable supporting means 134 consists of a series of relatively adjustable means linked together to permit positioning of the test body T" in any of different testing positions. The supporting rod 138 extends horizontally from a suitable supporting base (not shown) in which it is mounted for rotation about its own longitudinal axis. Rod 138 supports the plate 140 which carries a second plate 142 mounted thereon to slide transversely of the rod 138 and which in turn carries the linking plate 144 atop the vertical rod 143 mounted on plate 142 for rotation about its own longitudinal axis. The slidable plate 142 is positionable to permit adjustment of the test body T" along the length of the line element L. The linking plate 144 permits adjusting the angular position of the test body about its vertical axis with relation to the line element. Rotatably mounted upon the linking plate 144 by means of the horizontal rod 146 is a normally vertical supporting plate 148 carrying the adjusting plate 150 vertically slidable thereon. This adjusting plate 150 carries a post 152 to which is connected means 153 for gripping the test body, and permits vertical adjustment of the body with relation to the line element. The gripping device 153 is mounted atop the post 152 for adjustment about a horizontal axis and is securable in any position thereon by means of the set screw 154. This pivotal adjustment of the gripping device 153, in conjunction with the rotatability of supporting plate 148 upon horizontal rod 146, permits angular positioning of the test body for establishing the positional attitude thereof which permits minimum gripping pressure just sufficient to retain the same in the gripping device 153.

The gripping device itself comprises a pair of jaws 156 and 158, the latter being adjustable with respect to the former by means of adjustment knob 160. Each jaw is equipped with a gripping pad 162 of a suitably soft substance such as sponge rubber or the like capable of frictionally holding the test body T'' against slippage between the jaws and having sufficient flexibility to permit substantially unrestrained vibration of the test body without imposing appreciable loading thereon.

The illustrated means for exciting the test body T'' comprises the speaker device 80 previously described having a small orifice 84 directable transversely against a selected point on the specimen and carried upon a supporting arm 164 having a supporting ring 165 mounted thereon. The supporting arm 164 is connected to any suitably adjustable supporting apparatus (not shown) adapted to permit positioning the speaker unit in any desired orientation with respect to the test body. An output orifice 84 of a size bearing an area ratio of about 1 to 300 to the surface area of the side of the test body against which it is directed, as shown in FIGURE 1, for example, has been found optimum, although great latitude is permissible depending upon specimen characteristics.

The vibration detecting apparatus consists chiefly of elements previously described, including the line element L suspended between a fixed pulley 10 and a rotatable pulley 12, each pulley having its peripheral surface covered by vibration absorbing means 16, such as foam rubber or the like, comprising wave sinks for absorption of vibrations in the line element at its opposite ends.

The balance arm 14 carrying pulley 10 in this case extends vertically, pivotally mounted intermediate its ends upon the bracket 30, and has adjustable biasing means connected at its upper end comprising a variable chain weight 170 connected to the balance arm 14 and wrapped around the adjustable pulley 166 mounted for rotation about a horizontal axis atop the vertically extending arm 168. The extension arm 38 on balance arm 14 carries energy coupling means comprising a piezoelectric crystal 40 lightly engaging the line element L and suitably connected to control apparatus later described by means of an electrical conductor 42.

Connected to the other end of the line element L, supported by rotatably mounted pulley 12, is the variable chain weight 24 carried by pulley 174 similarly mounted upon the rod member 172. The pulley 12 is mounted for free rotation about its horizontal axis, while pulley 174 is securable by set screw means (not shown) in any selected rotative position to vary the proportion of chain weight 24 borne by the line element and thereby adjust its tension. The supporting arm 172 carrying these two pulleys is pivotable about a vertical axis 176 so that the plane of rotation of pulley 12 may be aligned with the line element L in accordance with the position of balance arm 14. The entire detecting apparatus is carried by the rotatable positioning arm 178 which is in turn mounted upon a pivot arm 180 carried by suitable supporting means 182 adapted for adjustment along the length of rod 189 and transversely thereof in a horizontal direction as depicted by the arrows 181 and 183, respectively. Operation of this nonsymmetrical component testing apparatus is discussed hereinafter.

Figure 3:
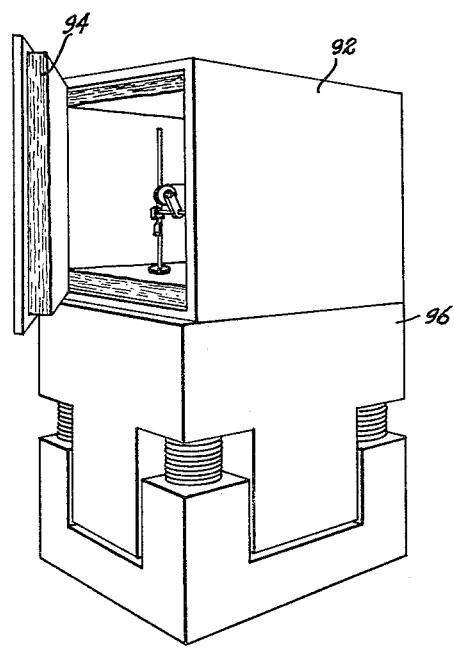
FIGURE 3 is a perspective view of a seismic table and acoustic hood used in conjunction with the apparatus of the invention for reducing external vibrational interference.

The apparatus of this invention is so sensitive that extra precautions are necessary to exclude vibrations from external sources. Thus for certain types of tests the apparatus is enclosed within an acoustic hood 92 (FIGURE 3) which includes sound absorbent walls 94. In addition, it is mounted upon a seismic table 96 having a natural frequency of vibration of the order of one and one-half cycles per second, in order to reduce the effect of tremors caused by external forces such as heavy equipment operating in the vicinity of the testing site.

Typical control apparatus for use with the testing units already described is shown in block diagram form in FIGURE 5, which also includes a chart indicating alternative positions for switches comprising the illustrated selection apparatus. The test unit proper comprises the specimen S, the support apparatus 100, the movable audio speaker 102, alternative line element excitation apparatus 104, and the line element detection apparatus 106. The output 108 of the testing unit is connected to an amplifier circuit which in this case includes a preamplifier 110, a variable band-pass filter 112 equipped with phase shifting means, a variable-gain amplifier 114 and a variable power amplifier 116. The observation and recording apparatus includes a voltmeter 120, an oscilloscope 122 and a digital counter 124. The variable-frequency, variable-amplitude signal generator 126 is connected through conductor 127 to one set of deflection elements X of the oscilloscope 122. The output 118 of the amplifier circuit is viewed on the oscilloscope by application thereof through switch E to the other set of deflection elements Y of the oscilloscope.

For open loop operation the signal generator 126 is connected through switch F to the power amplifier 116 to provide excitation energy for the test unit through switch B. For operation of the testing and control apparatus as a regenerative feedback loop the testing specimen is excited into vibration by suitable means such as by placing switch F in position 2 to connect the signal generator 126 to the testing unit. The phase of the input 129 to the specimen is matched with the phase of the output 108, using the oscilloscope 122 as a phase meter. Switch F is then moved to position 1 to disconnect the signal generator and close the loop so that the observation and recording apparatus and the testing unit thereby comprise a positive feedback loop or self-oscillator.

Adjustment of the phase relationship between the input and output of the testing circuit is accomplished by a combination of different techniques. The tension in the detecting line element L is varied, for which purpose the variable chain weights 24 (FIGURES 2 and 4), previously described, are provided. In addition (or alternatively) the distance along the line element from the point of contact of the element and specimen to the energy transfer coupling means (in this case the crystal 40) is varied to adjust the phase relationships in the test circuit. Fine phase adjustment is obtained electrically by means of the variable band-pass filter phase shifter 112.

The digital counter 124 is adapted to count the number of oscillations between any two predetermined voltage amplitudes. For use in this testing apparatus it is calibrated to measure the number of vibration cycles of the test body during decay of vibrations to a predetermined level after excitation energy is cut off. The counter ceases to count the vibrations when they drop below this level, which is established by applying the output of signal generator 126 to the counter through switches D and E (positions 2) and adjusting the counter sensitivity level to a selected signal generator output voltage. Switch D is additionally operable at any time when switch E is in position 1 to measure the frequency of vibration of the specimen. Switch C operates the constant time-lag dual switch B by means of the solenoid actuating unit 132. This combination permits simultaneous cut-off of energy supply to the testing unit and connection of the digital frequency counter 124 with exactly the same delay period each time. When the alternative line-element excitation apparatus is used, switch B is connected in a suitable manner (not shown) to operate the motor cam arrangement 90 (FIGURE 2), thereby to disengage the vibrating line element L' from the specimen. Then the digital counter 124 begins counting the decaying oscillations of the specimen just as excitation energy is cut off, and ceases counting at the selected lower cutoff voltage corresponding to a predetermined amount of vibration decay.

Thus relative Q measurements of different specimens are made by counting the decaying oscillations in digital counter 124. As is well known in the art, such measurements of oscillations can be mathematically converted to values of Q or internal friction for the material tested. Alternatively, such measurements may be obtained by comparing the amplitude decay curve of a material specimen or component with a standard decay curve drawn or superimposed on the face of oscilloscope 122. The decay time of the material being tested is compared to the standard decay curve by adjusting the sweep time of the oscilloscope, and the sweep time required to achieve matching is a relative measure of Q. For convenience, measurements taken by means of the disclosed system are referred to as measurements of Q, although their principal meaning is derived by comparison of similar measurements on different materials.

According to the basic measuring techniques of the invention, a testing specimen is first "tuned" for its maximum value of Q. When the measured value of Q is a maximum, the external loading on the specimen is a minimum, as indicated by the maximum number of vibrations obtainable between the two predetermined vibration amplitudes during decay.

With the control apparatus set for open loop operation adjustments are first made for establishing minimum external loading on the test body during vibration. This adjustment process is facilitated in the case of symmetrical specimens by simple manipulation of micrometer adjustments 62 and 68 (FIGURES 1 and 1a). In the case of nonsymmetrical components a more extensive series of adjustments is made to attain minimum loading conditions, namely by manipulation of the universally positionable supporting means 134 (FIGURE 4) for the test body and 136 for the detection apparatus. In this case the test body or component T'' is gripped lightly between the soft gripping pads 162 at a location estimated to be a node thereof. The positioning means 134 is adjusted until the center of gravity of the irregularly-shaped body is substantially vertically aligned with the point of gripping, either directly above or below the same. This initial adjustment orients the test body in optimum positional attitude permitting minimum gripping pressure thereon just sufficient to retain it in the gripping device 152. This "gravitational orineation" is maintained while the line element is positioned for contact with the test body near the anticipated node position and the supporting means is readjusted in accordance with the line element position so that plates 140 and 142 are substantially parallel with the line element to permit adjustment of the test body along the length of the line element.

The excitation means 80 is then positioned with respect to the test body by means of the movable supporting arm 164 and the control apparatus is energized. The resonant frequency of the test body and its desired mode of vibration, preferably the fundamental torsional mode, are searched out by varying the frequency of signal generator 126 and the position of the speaker orifice 84 adjacent the test body. When resonant frequency is established the signal generator output voltage is adjusted to its maximum value and the test body and line element are adjusted for maximum energy transfer using the oscilloscope 122 as an indicator. The line element L is adjusted for minimum contact pressure upon the test body by varying its tension and/or positioning it relative to the test body until the "grassy" pattern on the oscilloscope just becomes a clean oscillatory pattern, which indicates that minimum pressure sufficient to maintain continuous contact throughout each cycle of vibration is established. Phase adjustment is made as previously described. When further adjustment of the gripping position and the "gravitational orientation" of the test body, or the relative positions of the test body and the line element, or the position of the excitation speaker orifice 84 with respect to the test body results in no further increase in the amplitude of output vibrations, a minimum of external damping influence obtainable by such adjustments has been achieved.

Further minimizing of the external damping is attained by adjustments after several successive Q measurements. A Q measurement is made by depressing switch C into position 2, which operates the quick-throw unit 132 to throw switch B into position 2. Thus energy supply to the testing unit is interrupted and the digital counter 124 is connected to the output of the amplifier circuit as previously described. A greater number of oscillations counted between selected output voltage amplitudes during decay indicates a smaller amount of external damping and therefore a more accurate measurement of the Q of the specimen itself. The true resonant frequency of the specimen is most accurately attained after it is "Q tuned." The specimen is considered "tuned" for maximum Q when further sensitive adjustments of the supporting mechanism and the detecting apparatus result in no increase in the number of oscillations during decay. The system is then ready for actual testing or for other uses to be described hereinafter. Once the value of Q is established for a given material, changes in that value may be used for measuring changes in other characteristics of the material by comparison after temperature changes, mechanical working, fatigue, etc.

By providing means whereby a specimen may be tested while in virtually completely unrestrained resonant vibration, the line element and associated apparatus of this invention provide a solution to the chief problem inherent in prior testing devices, namely that of excessive external loading on the specimen. The line element arrangement functions in several ways to permit both the amplitude and frequency of vibrations in the specimen to be more sensitively detected than heretofore possible, while contributing virtually no external loading to the specimen. Firstly, it is found that a wire or elongated line element held under a small amount of tension is the most accurate means for sensitively detecting both amplitude and frequency of vibrations of a body in contact therewith, because there is negligible loss or distortion of the vibration wave form as it travels along the line element. Secondly, it is found that when such a line element is held in contact with a vibrating body near the center of the line element, with the element extending substantially transversely to the direction of the specimen's vibrations, its resistance to those vibrations is negligible. This is because such a line element has substantially a zero spring constant at its center. This is another way of saying that the mechanical advantage produced by a transverse force on the element approaches infinity as the distance moved by that force (i.e. the amplitude of the vibrations) approaches zero. Thirdly, there is substantially no feedback of energy to the specimen from the line element, since standing waves are effectively prevented from forming thereon by the wave sinks at its ends. As previously mentioned, standing waves are also avoided by selecting the properties of the line element and the force of tension under which it is held so as to establish its natural frequency of vibration at a value remote from the frequency of vibration of the specimen. The transducer is formed and located at a position along the line element such that it imposes negligible resistance to the traveling waves and thereby creates negligible reflection thereof, and is positioned a sufficient distance from the wave sink so as to be substantially unaffected by any lack of complete efficiency thereof.

These techniques conjointly tend to insure only forced vibrations or traveling waves in the line element, which are then sensitively detected and converted to electrical oscillations or oscillations of some other form of energy. The vibration detection apparatus is so sensitive that the line element need not be held in contact with the specimen at an antinode, but is entirely capable of picking up the vibrations at or near a nodal area or region. By locating the pickup contact point at or near a node, interference with free vibration of the specimen is minimized. The line element is, in fact, sufficiently sensitive to permit detecting and studying the somewhat irregular vibrational distortion of the specimen within these nodal regions themselves.

For symmetrical specimens particularly it is found that testing in the torsional mode is about four times as sensitive as testing in the flexural mode. This is primarily due to the fact that torsional testing, more than flexural testing, produces strain in a material along the same planes of shear which are involved in transformations occurring in the material during mechanical working, heat treatment, fatigue damage, and the like. In addition, external loading can be reduced to an even lower value in torsional testing in the fundamental mode, since there is only one higher energy nodal area and since only one support is used.

A specially-shaped specimen is usually chosen for torisional testing of materials, as illustrated in FIGURE 1a. While the resonant frequency of a particular specimen is affected by its shape, its Q value theoretically is not. Since this invention utilizes Q as a test parameter rather than resonant frequency, the specimen may be designed having a shape and symmetry providing for a simple and quick supporting or mounting procedure and also a more sensitive measurement of the Q of the material itself, with less regard for the resulting natural frequency of the particular specimen. In this case the specimen T' consists of an elongated strip of material with a narrowed center section and relatively wide end sections, a shape found advantageous for certain types of Q testing. The holes in its ends are provided to facilitate securing it to an apparatus component for fatigue damage testing now to be described.

In addition to its utility for general materials analysis, another application of the invention is its use for indicating the extent of progressive fatigue damage of a machine component or the like under actual service conditions. A long-standing and current problem in the analysis and measurement of fatigue properties of materials and components has been the need for a quantitative measurement of fatigue damage due to a combination of interrelated factors, including stress due to tension, compression or shear loading, temperature change, vibration, corrosive atmospheric conditions, and others. According to this application of the invention a test specimen is formed of the same or like material as that of a component to be studied, such as the leg of an aircraft landing gear. Initially this test specimen is attached to the component and the component is subject to simulated operating conditions over a period of time. The loading conditions are periodically interrupted and the test specimen is removed and tested in the "tuned Q" testing apparatus of this invention for its interim Q value. The characteristic Q curve of the specimen is thus established as a function of the progressive fatigue damage of the component under study due to the combined effects of the various factors involved, up to the point of failure of the component. In actual service, then, a similar test specimen, calibrated by virtue of the preliminary study with its counterpart, is attached to a similar apparatus component, such as a landing gear leg, and is periodically removed and Q tested during the useful life of the component. The changing value for Q for the gauge specimen at different intermittent Q tests indicates the progressing level of fatigue damage of the component itself. Thus by noting when the Q value indicates a dangerous level of fatigue damage, the component itself may be removed from service before it can fail. In such a technique the component itself need not be removed from the structure of which it is a part in order to determine its condition. Moreover, no special preparation of the gauge specimen is necessary before its attachment to the component or for the periodic testing, and its removal, Q testing and reattachment to the component take only a short time.

When the torsional vibration testing system of this invention is set up as previously described as a part of a regenerative feedback loop or self-oscillator, it has utility apart from its application as a means for materials analysis, namely its use as an audio frequency generator or oscillator per se. Such an oscillator will normally be designed to operate in the frequency range of about 500 to 10,000 cycles per second, the general range in which tuning fork oscillators and the like have been used heretofore. An oscillator constructed according to this invention, however, possesses a Q value of the order of five to six times higher than a tuning fork oscillator constructed for the same purposes, making it much less susceptible to interference due to noise outside the desired frequency band. In addition, this oscillator requires less energy input than a comparable tuning fork oscillator.

Such an oscillator is also adaptable by well-known circuit combinations for use as band-pass filter, characterized by a higher Q than heretofore obtained in comparable filters. In addition, it may be adapted for use as a temperature indicator in the range of 2500 to 4000 degrees Fahrenheit, for example, in which range thermocouple temperature indicators have been used in the past. In such a device, which may be called tuned-Q temperature indicator, either the entire detection apparatus is included within a temperature zone Z, as diagrammatically indicated in FIGURE 5, or, by provision of suitable openings (not shown), the line element only is passed through the temperature variation zone Z containing the specimen, as in FIGURES 1 and 1a, for example. Such a temperature indicator gives a highly accurate and repeatable measurement of temperature as a function of the resonant frequency of the specimen within a range of approximately 500 degrees Fahrenheit. When provision is made for periodically or continuously "retuning" the specimen for maximum Q, a larger temperature range may be measured. In this way the apparatus of this invention may be adapted for studying the reaction of materials to rapid changes of temperature, such as those incurred in thermal shock tests, heat treatment, and the like.

While the invention has been herein illustratively described in terms of certain presently preferred forms thereof, it will be recognized by those skilled in the art that various changes and modifications therein with respect to details may be made without departing from the spirit and scope of the invention as defined in the appended claims.

I claim as my invention:

1. In an energy transfer system including a vibratable test body, means for supporting said body at at least one location defining a nodal point on said body when in vibration, an energy transfer device separate from said support means, said device comprising an elongated flexible vibratable line element, holding means secured to the ends of said element and operable to maintain said element substantially straight under tension with said element extending substantially throughout its length transversely to the direction of vibration of said body, positioning means operatively associated with the supporting means and the holding means to effect relative positional adjustment between the element and body and operable to establish substantially only point contact therebetween at a relative location intermediate the ends of the element, with minimum contact pressure sufficient to maintain such contact continuous throughout each vibration cycle, and energy transfer coupling means operatively associated with said element at a location spaced from said point of contact and operable to effect transformation between vibration of said element and another form of energy.

2. The apparatus defined in claim 1 wherein said vibratable line element comprises a length of wire.

3. The apparatus defined in claim 1 wherein said holding means includes at least one line-holding element having a curved surface tangent to said line element and about which the line element is wrapped, said surface having vibration absorbent padding means thereon in contact with said line element.

4. The apparatus defined in claim 1 wherein said holding means includes tension control means operable to stretch said element under a tension force sufficient to establish its resonant frequency at a value differing substantially from the frequency of vibration of said body.

5. The apparatus defined in claim 4 wherein said tension control means comprises means defining a curved surface mounted for pivotal movement whereby such surface remains tangent to the position of said line element, and means connected to the line element and operable to urge the same into tangential movement around such pivotable means defining a curved surface.

6. The apparatus defined in claim 5 further including vibration-absorbent padding means interposed between said curved surface and said line element to prevent formation of standing waves in said element.

7. The apparatus defined in claim 1 wherein said energy transfer coupling means is located intermediate the ends of said element and wherein said holding means includes vibration-absorbent damping means engaging each end of said line element to inhibit formation of standing waves therein while permitting maximum traveling wave energy transfer to said coupling means.

8. The apparatus defined in claim 7 wherein said damping means comprises means defining a curved surface tangent to said line element and having vibration-absorbent padding thereon, said holding means including means securing the end portions of said line element in circumferential relation to said surface in contact with said padding means.

9. The apparatus defined in claim 7 wherein said positioning means includes a balance arm carrying at least one such damping means on an end thereof, said balance arm being pivotally mounted upon a supporting frame and operable to establish said minimum pressure sufficient to maintain such contact continuous.

10. The apparatus defined in claim 1 wherein said positioning means includes a balance arm operatively associated with said holding means and pivotally mounted upon a supporting frame, said balance arm being operable to establish said minimum pressure sufficient to maintain such contact continuous.

11. A vibration energy testing system comprising the energy transfer device defined in claim 1, and excitation means separate from said support means, said excitation means being operable to induce vibrations in said body while imposing substantially negligible loading thereon, said positioning means further including means operatively associated with said excitation means for positioning the same relative to said test body to induce a selected mode of vibration therein.

12. The system defined in claim 11 wherein said excitation means comprises a sound source and means enclosing said source and defining an acoustical output orifice for directing acoustic energy transversely against a selected localized point on said body, said orifice having small dimensions relative to the surface area of the side of the test body against which it is directed.

13. Apparatus for optimizing energy transfer between a vibratable body includable in said apparatus, and an energy system separate from said body, said apparatus comprising support means operable to engage said body at a minimum number of locations defining nodal points of said body when in vibration, whereby to impose minimum loading thereon, and energy transfer means separate from said support means, said energy transfer means including an elongated flexible vibratable line element, holding means secured to the ends of said element and operable to maintain said element substantially straight under tension, with said element extending substantially throughout its length transversely to the direction of vibration of the body, positioning means operatively associated with the supporting means and the holding means to effect relative positional adjustment of the element and body and operable to establish substantially only point contact therebetween at a relative location intermediate the ends of the element, with minimum contact pressure sufficient to maintain such contact continuous throughout each vibration cycle, and energy transfer coupling means operatively associated with said element and operable to effect transformation between vibration of the element and said other energy system.

14. The apparatus defined in claim 13 wherein said energy transfer means comprises excitation means for delivering energy to said vibratable body from an energy source, said energy transfer coupling means comprising transducer means energizable by energy from said source and operable to convert such energy to transverse vibrations in said element.

15. The apparatus defined in claim 13 wherein said energy transfer means comprises detector means for transferring vibration energy in said body to another form of energy, said energy transfer coupling means comprising transducer means operable to convert vibration energy in said line element to such other form of energy.

16. The apparatus defined in claim 13 wherein said support means comprises universally positionable body gripping means adapted to grip said body while imposing negligible loading thereon and operable to hold the same at optimum positional attitude minimizing loading thereon.

17. The apparatus defined in claim 16 wherein said positioning means includes mounting elements for said support means and said holding means and is operable positionally and angularly to adjust the body and element relatively with respect to three mutually orthogonal axes, one of said axes lying parallel to the length of said line element.

18. A vibration energy testing system comprising the apparatus defined in claim 16, and excitation means separate from said support means, said excitation means being operable to induce vibrations in said body while imposing substantially negligible loading thereon, said positioning means further including universally positionable mounting means carrying said excitation means and operable to position the same relative to said body to induce a selected mode of vibration therein.

19. The system defined in claim 18 wherein said excitation means comprises a sound source and means enclosing said source and defining an acoustical output orifice for directing acoustic energy transversely against a selected localized point on said body, said orifice having small dimensions relative to the surface area of the side of the test body against which it is directed.

20. An oscillatory circuit for producing oscillations of controlled frequency, including a frequency determining device comprising supporting means adapted to support a vibratable body includable in said device, said supporting means being operable to engage said body at at least one location defining a nodal point thereof when said body is vibrating and operable to impose minimum loading on said body, excitation means operable to excite said body into vibration, regenerative feedback means separate from said supporting means, an elongated flexible vibratable line element, holding means secured to the ends of said element are operable to maintain said element substantially straight under tension, with said element extending substantially throughout its length transversely to the direction of vibration of the body, positioning means operatively associated with the excitation means, the supporting means and the holding means to effect relative positional adjustment thereof and operable to establish substantially only point contact between said element and said body at a relative location intermediate the ends of the element, with minimum contact pressure sufficient to maintain such contact continuous throughout each vibration cycle, energy transfer coupling means operatively associated with said element and operable to effect transformation between vibrational energy of the element and electrical energy in said feedback means, said feedback means having an input connected to said coupling means and an output connected to said excitation means.

21. The apparatus defined in claim 20 wherein said holding means includes tension control means operable to stretch said element under a tension force sufficient to establish its resonant frequency at a value differing substantially from the frequency of vibration of said body.

22. The apparatus defined in claim 21 wherein said tension control means comprises means defining a curved surface mounted for pivotal movement whereby such surface remains tangent to the position of said line element, and means connected to the line element and operable to urge the same into tangential movement around such pivotable means defining a curved surface thereby to vary the tension in said element.

23. The apparatus defined in claim 22 further including vibration-absorbent padding means interposed between said curved surface and said line element to prevent formation of standing waves in said element.

24. The apparatus defined in claim 20 wherein said energy transfer coupling means is located intermediate the ends of said element and wherein said holding means includes vibration-absorbent damping means engaging each end of said line element to inhibit formation of standing waves therein while permitting maximum traveling wave energy transfer to said coupling means.

25. The apparatus defined in claim 24 wherein said damping means comprises means defining a curved surface tangent to said line element and having vibration-absorbent padding thereon, said holding means including means securing the end portions of said line element in circumferential relation to said surface in contact with said padding means.

26. The apparatus defined in claim 20 wherein said positioning means includes a balance arm operatively associated with said holding means and pivotally mounted upon a supporting frame, said balancing arm being operable to establish said minimum contact pressure sufficient to maintain such contact continuous.

27. An energy transfer system for transferring energy between a vibratable test body includable in said system and another form of energy, said system comprising movable supporting means for said body adapted to hold the same while imposing negligible loading thereon and universally positionable to permit holding said body in a testing position which permits imposing such negligible loading thereon, control apparatus, excitation means connected to said control apparatus and operable in response thereto to induce vibrations in said body while imposing substantially negligible loading thereon, and energy transfer means including an elongated flexible vibratable line element, holding means for said line element, said line element holding means being universally positionable with respect to said test body to extend said element transversely to the direction of vibration of said body under a tension force sufficient to establish the resonant frequency of said element at a value substantially removed from the frequency of vibration of said body, said line element holding means being further operable to establish substantially only point contact between said element and body at a relative location intermediate the ends of the element, with minimum contact pressure sufficient to maintain such contact continuous throughout each vibration cycle, and energy transfer coupling means operatively associated with said element and said control apparatus and cooperable to effect transformation from vibrational energy of the element to a different form of energy in said control apparatus.

28. The method of measuring the Q factor of a vibratable test body of nonsymmetrical shape utilizing a stretched line element, said method comprising the steps of gripping said test body by means capable of establishing substantially negligible loading thereon and at a location on said body defining a nodal region thereof when the same is vibrated in resonance, positioning said body with its center of gravity located in substantially vertical alignment with said location of gripping, positioning the line element in point contact with the test body intermediate the ends of the line element and adjacent a nodal region of said body with said line element in transverse relationship to the direction of vibration of said test body while subjecting said body to resonant vibration and absorbing traveling waves in the line element at the extremities thereof, terminating excitation of the test body, and measuring the rate of decay of vibrations in the test body detected through the element.

29. The method of measuring the Q factor of a vibratable test specimen utilizing a stretched line element, comprising the steps of exciting the specimen into vibration, positioning the line element in substantially only point contact with the specimen at a point intermediate the ends of the element with the element extending transversely to the direction of vibration of the specimen, absorbing induced traveling waves at the ends of the element while detecting traveling wave energy at a point intermediate said ends and spaced from said point of contact, minimizing support loading on said specimen by adjusting support location thereon to maximize energy transfer to said element, and separately minimizing loading on said body by said element by adjusting the transverse contact pressure therebetween to minimum contact pressure sufficient to maintain said contact continuous throughout each vibration cycle, while further adjusting the location of said contact point on the specimen to obtain substantially minimum measurable energy transfer therebetween.

References Cited by the Examiner
UNITED STATES PATENTS

| | | | |
|---|---|---|---|
| 2,178,252 | 10/39 | Forster | 73—67.2 |
| 2,682,167 | 6/54 | Gamarekian | 73—67.3 |
| 3,005,334 | 10/61 | Taylor et al. | 73—67.3 |
| 3,019,387 | 1/62 | Rowe | 73—67.2 |
| 3,020,750 | 2/62 | Briscoe | 73—71.4 |

RICHARD C. QUEISSER, *Primary Examiner.*

JOHN P. BEAUCHAMP, *Examiner.*